United States Patent
Kuhl et al.

(10) Patent No.: US 7,636,357 B2
(45) Date of Patent: Dec. 22, 2009

(54) METHOD OF COLLECTING CONSISTENT FLOW STATISTICS THROUGH MULTIPLE CONGESTION POINTS WITHIN A MULTI-SERVICE SWITCH/ROUTER AND MULTI-SERVICE SWITCHES/ROUTERS PROVISIONED WITH SAME

(75) Inventors: Tim Kuhl, Kanata (CA); William McConnochie, Nepean (CA); Robert John Johnson, Ottawa (CA); Andrew Dolganow, Kanata (CA)

(73) Assignee: Alcatel Lucent, Paris (FR)

( * ) Notice: Subject to any disclaimer, the term of this patent is extended or adjusted under 35 U.S.C. 154(b) by 515 days.

(21) Appl. No.: 11/412,084

(22) Filed: Apr. 27, 2006

(65) Prior Publication Data

US 2007/0253338 A1    Nov. 1, 2007

(51) Int. Cl.
H04L 12/56 (2006.01)
H04J 3/22 (2006.01)
(52) U.S. Cl. .................................... 370/392; 370/465
(58) Field of Classification Search ................. 370/352, 370/355, 356, 401, 412, 413, 465, 469, 470, 370/471, 474, 392
See application file for complete search history.

(56) References Cited

U.S. PATENT DOCUMENTS

| | | | | |
|---|---|---|---|---|
| 6,680,933 | B1* | 1/2004 | Cheesman et al. | 370/352 |
| 6,990,121 | B1* | 1/2006 | Stiles et al. | 370/498 |
| 2003/0095558 | A1* | 5/2003 | Chung et al. | 370/417 |
| 2004/0022257 | A1* | 2/2004 | Green et al. | 370/401 |
| 2005/0063385 | A1* | 3/2005 | Wybenga et al. | 370/392 |
| 2006/0050738 | A1* | 3/2006 | Carr et al. | 370/474 |

* cited by examiner

Primary Examiner—Hong Cho
Assistant Examiner—Saba Tsegaye
(74) Attorney, Agent, or Firm—Kramer & Amado, P.C.

(57) ABSTRACT

A method of collecting consistent flow statistics through multiple congestion points within a multi-service switch/router is enabled by computing a payload length of each traffic unit received from a fabric of the switch/router. A PHY-level header containing the payload length, a class of service and a service ID is appended to the switch-internal encapsulated payload. Information associated with the PHY-level header is used at physical level congestion points to collect consistent flow statistics.

16 Claims, 3 Drawing Sheets

METHOD OF COLLECTING CONSISTENT FLOW STATISTICS THROUGH MULTIPLE CONGESTION POINTS WITHIN A MULTI-SERVICE SWITCH/ROUTER AND MULTI-SERVICE SWITCHES/ROUTERS PROVISIONED WITH SAME

CROSS-REFERENCE TO RELATED APPLICATIONS

This is the first application filed for the present invention.

MICROFICHE APPENDIX

Not Applicable.

TECHNICAL FIELD

The present invention relates in general to multi-service switches/routers and, in particular, to a method of collecting consistent flow statistics through multiple congestion points within a multi-service switch/router and multi-service switches/routers provisioned with the method.

BACKGROUND OF THE INVENTION

Multi-service switches/routers are well known in the art and are widely deployed as access points to multi-protocol label switching (MPLS) networks. Multi-service switches/routers must carry many different types of traffic including: Frame Relay; Asynchronous Transfer Mode (ATM); Internet Protocol Version 4 (IPv4); Internet Protocol Version 6 (IPv6); Virtual Wire; etc.

FIG. 1 is a schematic diagram illustrating an exemplary architecture of a prior art multi-service switch/router 10. A plurality of links 12 provide input/output (I/O) channels over which network traffic of various types is carried. The links 12 are connected to a plurality of Media Adapter Modules 14, only four of which are shown: 14a, 14b, 14c, and 14d. The Media Adapter Modules 14 are in turn connected to one or more payload processing and queuing units 16, only two of which are shown: 16a and 16b. Both the Media Adapter Modules 14 and the payload processing and queuing units 16 perform many complex functions, as will be explained below with reference to FIG. 3. Each payload processing and queuing unit 16 is connected to a switch fabric 18 which functions in a manner well known in the art to transfer payload traffic between the payload processing and queuing units 16.

FIG. 2 is a schematic diagram of a plurality of the multi-service switches/routers 10 configured to provide access service to a Multiprotocol Label Switched (MPLS) network 20. Only four of the multi-service switches/routers are shown: 10a, 10b, 10c and 10d. As can be seen, the multi-service switches/routers 10 can accept input in a plurality of different transport protocols, such as: Asynchronous Transfer Mode (ATM); Frame Relay (FR); Ethernet; Packet over Sonet (PoS); Point-to-Point Protocol (PPP); MultiLink ATM; MultiLink FR; MultiLink PPP; and others.

In order to handle the many different transport protocols and traffic types, multi-service switches/routers are becoming more complex. To provide reliable multi-layer functionality, such as dependable Layer 3 Quality-of-Service (QoS) in conjunction with dependable Layer 2 QoS, different congestion points within a switch/router are required. When a traffic flow traverses two or more congestion points within the switch/router it is desirable to maintain consistent discard and throughput statistics for the traffic. This permits users to easily identify how much traffic is dropped within the switch/router, and how much traffic is successfully delivered, without a requirement for additional statistics correlation equipment. There are many prior art mechanisms such as Netflow® and Cflowd® that are used in routers to monitor and report Internet Protocol (IP) packet flows. However, those mechanisms are not designed to deal with different types of traffic and cannot be used to maintain consistent flow statistics if there are multiple congestion points within a multi-service switch or router.

Since multi-service switches/routers carry many different types of traffic, correlation of discards can be difficult to achieve at multiple congestion points. This is especially true when traffic is translated into different encapsulation formats as it traverses a switch/router. Currently, it is frequently left to a "billing agent" to correlate discards at various layers on a switch/router. Billing agents are generally complex and often require a stand-alone application and/or a network element that adds capital and operational expenses for network operators.

It is therefore highly desirable to provide a method of collecting consistent flow statistics through multiple congestion points within a multi-service switch/router.

SUMMARY OF THE INVENTION

It is an object of the invention to provide a method of collecting consistent flows statistics through multiple congestion points within a multi-service switch/router, and to provide multi-service switches and routers adapted to collect such statistics.

The invention therefore provides a method of collecting consistent flow statistics through multiple congestion points within a multi-service switch/router, comprising: receiving payload from a switch fabric of the multi-service switch and examining ingress identifiers associated with the payload to determine an egress encapsulation type of the payload, an egress service identification, and a payload priority; computing an egress length of the payload; converting the payload to a switch-internal encapsulation format and appending a PHY-level header to the payload identifying the service and the payload length; and using the PHY-level header at physical level congestion points within the switch/router to collect consistent flow statistics.

The invention further provides a multi-service router comprising computer program instructions for receiving payload from a switch fabric of the multi-service router and examining ingress identifiers associated with the payload to determine an egress encapsulation format of the payload, an egress service identification, and a payload priority; computing an egress length of the payload; converting the payload to a switch-internal encapsulation. format and appending a PHY-level header to the encapsulated payload identifying the service and the payload length; and using the PHY-level header at physical level congestion points within the switch to collect consistent flow statistics.

The invention further provides a multi-service switch comprising computer program instructions for receiving payload from a switch fabric of the multi-service switch and examining ingress identifiers associated with the payload to determine an egress encapsulation format of the payload, an egress service identification, and a payload priority; computing an egress length of the payload; converting the payload to a switch-internal encapsulation format and appending a PHY-level header to the payload identifying the service and the egress payload length; and using the PHY-level header at physical level congestion points within the switch to collect consistent flow statistics.

BRIEF DESCRIPTION OF THE DRAWINGS

Further features and advantages of the present invention will become apparent from the following detailed description, taken in combination with the appended drawings, in which.

It should be noted that throughout the appended drawings, like features are identified by like reference numerals.

DETAILED DESCRIPTION OF PREFERRED EMBODIMENTS

The invention provides a method of collecting consistent flow statistics through multiple congestion points within a multi-service switch/router. In accordance with the invention, payload is received from a switch fabric of the multi-service switch/router and ingress identifiers associated with the payload are examined to determine an egress encapsulation type for the payload. An egress service identification and a payload priority for the payload are also determined. An egress payload length is then computed. The payload is converted to a switch-internal encapsulation format and a PHY-level header is appended to the payload to identify the service and the payload length. The PHY-level header is used at physical congestion points within the switch to collect consistent flow statistics.

Figure 1:
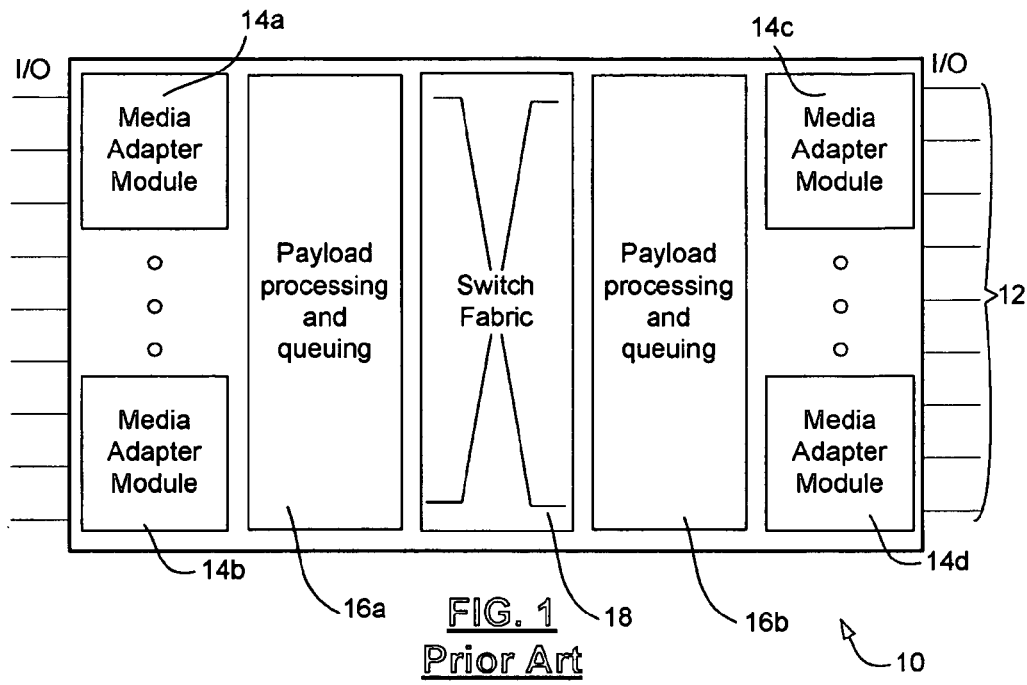
FIG. 1 is a schematic diagram of a multi-service switch/router in accordance with prior art.
Figure 2:
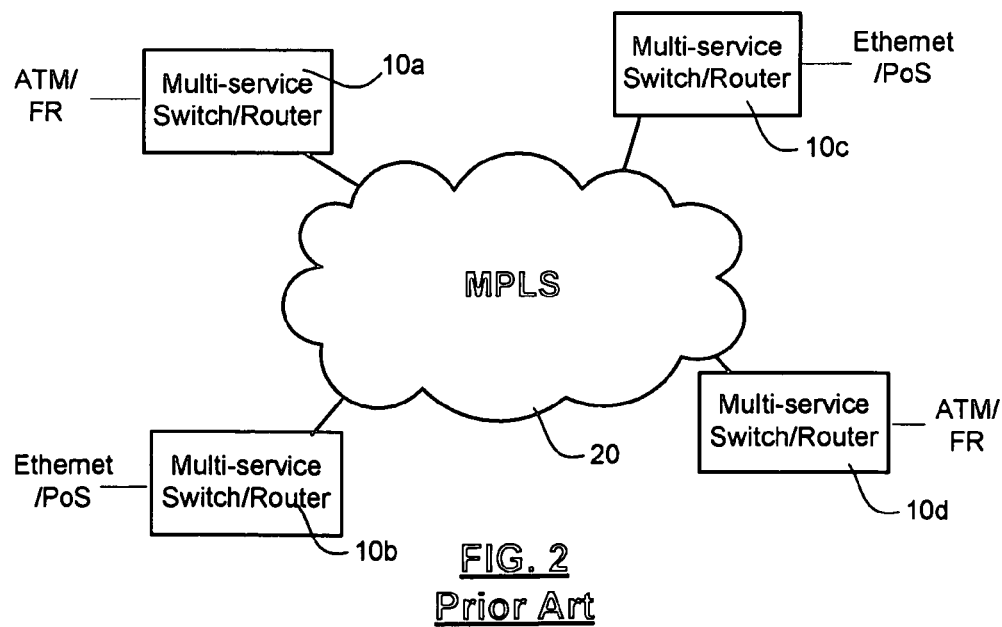
FIG. 2 is a schematic diagram of a prior art multiprotocol label switched (MLPS) network and multi-service switches/routers that serve as service access points to the MPLS network.
Figure 3:
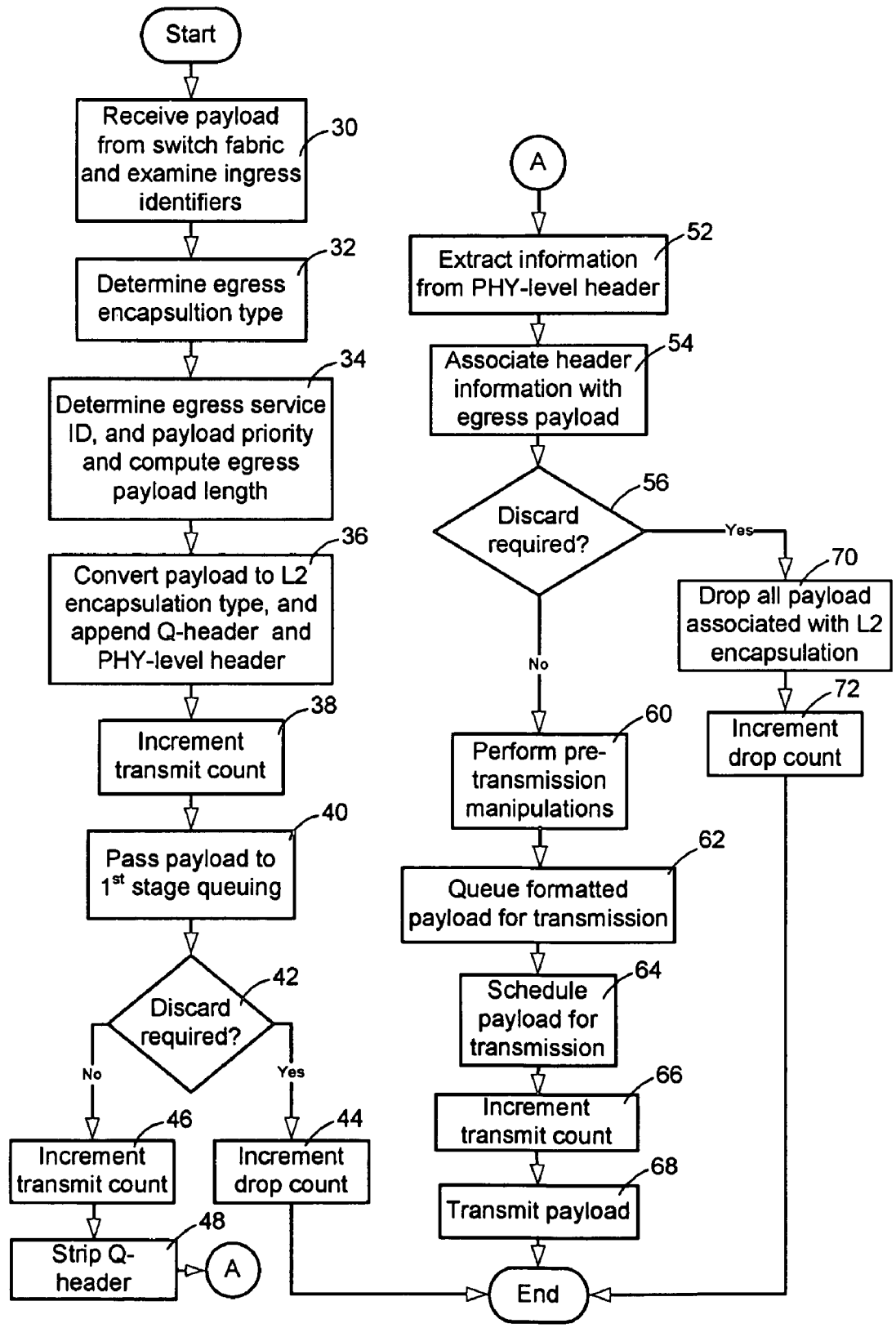
FIG. 3 is flow chart illustrating the method in accordance with the invention.

FIG. 3 is a flow chart illustrating principal steps of the method in accordance with the invention. The method begins with "first stage adjustments" when payload is received from an egress side of a switch fabric 18 of a multi-service switch/router 10 (see FIG. 1), and ingress identifiers associated with the payload are examined (step 30). Examination of the ingress identifiers permits a payload processing and queuing unit 16 (see FIG. 1) to determine an egress encapsulation type for the payload (step 32). The payload processing and queuing unit 16 also determines an egress service identification (ID) and a payload priority for the payload received. As well, an egress payload length is computed (step 34). The egress payload length, hereinafter referred to simply as the "payload length" it is a "billable length" of the payload. Computation of the payload length at this point is quite important as it provides an accurate measure of billable payload size that is used by physical layer processes at congestion points in the switch to accumulate accurate flows statistics, as will be described below in more detail.

The payload is then converted to a switch-internal encapsulation format, in this example a Level 2 (L2) encapsulation format. After conversion, a Q-header and PHY-level header are appended to the encapsulated payload (step 36). The Q-header is a switch-internal header used in the provision of Level 3 and Level 2 queuing and the provision of Quality-of-Service (QoS). The Q-header contains at least information about: payload length; class of service; payload priority; and service identification. The class of service may be any number, label, index or identifier that identifies a priority of the payload, points to a drop precedent, or points to a specific queue or range of queues. The PHY-level header in accordance with one embodiment of the invention contains at least information about: payload length; class of service; and, service identification. As in the Q-header, the class of service in the PHY-level header may be any number, label, index or identifier that identifies a priority of the payload, points to a drop precedent, or points to a specific queue or range of queues.

After of the Q-header and PHY-level header are appended to the encapsulated payload, the payload processing and queuing unit 16 increments a transmit count (step 38) using the egress payload length computed in step 34. The payload processing and queuing unit 16 then passes the payload to its first stage queuing component (step 40). The first stage queuing component determines (step 42) whether the queues for the service identified by the service identification, payload priority and class of service have adequate buffer space for the payload. In other words, the queuing component determines if a discard of the payload is required. If the payload must be discarded, a drop count is incremented using the computed payload length (step 44) and further handling of the payload ends.

If it is determined in step 42 that discard of the payload is not required, the queuing component increments its transmit count using the computed payload length (step 46) and strips the Q-header from the L2 encapsulated payload (step 48). The payload is then passed to the Media Adapter Module 14 (see FIG. 1) for second stage adjustments. During the second stage adjustments, the Media Adapter Module 14 extracts the information from the PHY-level header (step 52), and associates that information with the egress payload (step 54). The Media Adapter Module 14 then passes the payload to second stage queuing, which examines its transmit queues to determine whether queue buffer space is available for the class of service associated with the service identified by the PHY-level header information. In other words, the second stage queuing determines whether the payload must be discarded (step 56) or the payload can be transmitted.

If the payload is not discarded, final pre-transmission manipulations are then performed (step 60). The final pre-transmission manipulations may include operations such as: ATM Cell Loss Priority (CLP) marking; Explicit Forward Congestion Information (EFCI) marking; Discard Eligibility (DE) marking; sequence number insertion; etc. The payload is then queued for transmission (step 62), and scheduled for transmission (step 64).

After performing pre-transmission manipulations, the Media Adapter Module 14 increments its transmit count (step 66) using the PHY-level header information that it associated with the payload in step 54. Thus, an accurate high-level measure of the billable length of the transmitted payload is collected at the physical transmit level.

If it was determined at step 56 that the payload had to be discarded, all payload associated with the Level 2 encapsulation is dropped (step 70). The Media Adapter Module 14 then increments its drop count (step 72) using the PHY-level header information it associated with the payload in step 54. Thus, an accurate high-level measure of the billable length of the dropped payload is collected at the second stage queuing level.

Figure 4:
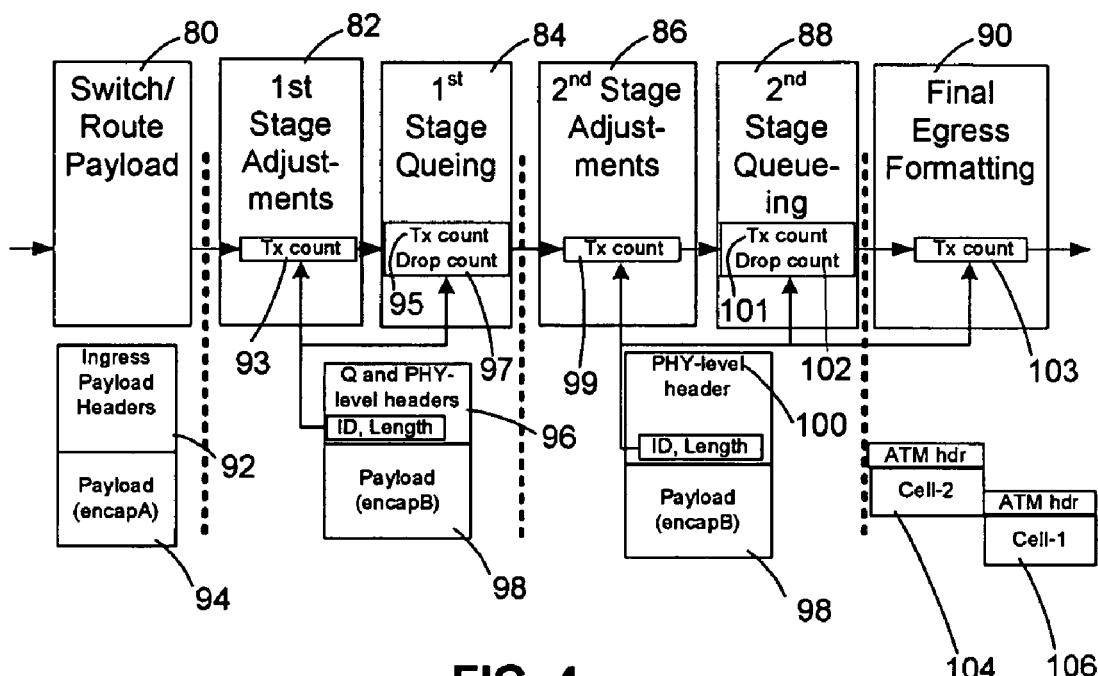
FIG. 4 is a graphical illustration of an application of the method in accordance with the invention.

FIG. 4 is a graphical illustration of the process described above with reference to FIG. 3. As explained above, when payload is switched/routed 80 through the switch fabric 18 (see FIG. 1), it traverses the switch fabric 18 in a first encapsulation format (encapA) 94 with associated ingress payload headers 92. After the payload is received from the switch fabric it undergoes first stage adjustments 82. As explained above, those first stage adjustments include converting the payload to a switch-internal encapsulation format (encapB) 98 and appending a Q-header and a PHY-level header 96 to the encapsulated payload. As a part of first stage adjustments, a transmission count 93 is incremented in order to accumulate statistics related to a billable length of payload received from the switch fabric 18. Information inserted in the Q-header and PHY-level header 96 is used to increment the transmission count 93. The payload is then passed to first stage queuing 84. As also explained above with reference to FIG. 3, during first stage queuing 84 either a transmission count 95 or a drop count 97 is incremented, depending on whether the payload had to be discarded at that stage.

If it is not discarded, the payload is passed to second stage adjustments 86. As likewise explained above with reference to FIG. 3, the second stage adjustments include the conversion of the PHY-level header 100 to information associated with the formatted payload and pre-transmission manipulations. That PHY-level header information is used to increment the second stage transmit count 99 before the payload is transferred to second stage queuing 88.

If adequate transmit buffer space is available for the payload, the second stage queuing 88 increments its transmission count 101, and, if not, the second stage queuing 88 increments its drop count 102 using the PHY-level header information associated with the payload by the second stage adjustments 86. After final egress formatting 90 is performed, the payload is queued and scheduled for transmission. After final egress formatting 90, a last transmission count 103 is incremented using the PHY-level header information associated with the payload by the second stage adjustments 86, and the payload is transmitted. In this example, the payload is transmitted in the form of ATM cells 104, 106.

The invention provides several distinct advantages over prior art methods of collecting payload flow statistics through multiple congestion points in a multi-service switch/router. For example, only the element that performs the first stage adjustments needs to be aware of the egress encapsulation format of the payload in order to know the "billable" length of the payload. Since there are a large number of payload encapsulation formats, having a consistent mechanism for determining the billable length of all egress encapsulation formats through several stages of the switch/router greatly simplifies the collection and presentation of flow statistics. As well, transmit statistics for multiple layers can be given from the last discard point based on a payload length carried from the higher layers.

The embodiments of the invention described above are intended to be exemplary only. The scope of the invention is therefore intended to be limited solely by the scope of the appended claims.

We claim:

1. A method of collecting consistent flow statistics through multiple physical-level congestion points within a multi-service switch/router, comprising:
    receiving a payload from a switch fabric of the multi-service switch/router, said payload in a given first encapsulation format having given ingress identifiers and, based on an examining of said ingress identifiers, determining an egress encapsulation format of the payload, an egress service identifier, and a payload priority;
    computing an egress length of the payload;
    converting the payload to a switch-internal encapsulated payload having an appended PHY-level indicating the egress service identifier and the egress length;
    performing a first priority-based transmission/discarding of the switch-internal encapsulated payload, at a first physical-level congestion point of the multiple physical-level congestion points, said performing including determining, based in part on the PHY-level header of the switch-internal encapsulated payloads, whether a transmit or a discard is required;
    performing a second priority-based transmission/discarding of switch-internal encapsulated payloads transmitted by the first physical-level congestion point, at a second physical-level congestion point of the multiple physical-level congestion points, said performing including determining, based in part on the PHY-level header of the switch-internal encapsulated payloads, whether a transmit or a discard is required;
    collecting congestion flows statistics, including collecting both a first physical level flows statistics based on the first priority-based transmission/discarding of switch-internal encapsulated payloads at the first physical level congestion point and collecting a second physical level flows statistics based on the second priority-based transmission/discarding of switch-internal encapsulated payloads at the second physical level congestion point within the multi-service switch/router.

2. The method of claim 1 further comprising:
    incrementing a first transmit count in association with a transmitting performed by said first priority-based transmission/discarding of the switch-internal encapsulated payloads; and
    incrementing a second transmit count in association with a transmitting performed by said second priority-based transmission/discarding of the switch-internal encapsulated payloads.

3. The method of claim 1 wherein said converting the payload to a switch-internal encapsulated payload further comprises appending a Q-header to the switch-internal encapsulated payload, the Q-header comprising at least information about: payload length; class of service; and service identification.

4. The method of claim 3, wherein each of said first and second priority-based transmission/discarding further comprises examining the egress service identification, and payload priority, and based on said examining, determining whether a discard of the switch-internal encapsulated payload is required.

5. The method of claim 1 wherein at least one of said collecting a first physical level flows statistics and said collecting a second physical level flows statistics includes, if the determining of said collecting determines a discard of the payload is required, incrementing a first cueing stage drop count using the computed egress length indicated by the PHY-layer header and a processing of the payload.

6. The method of claim 1 wherein at least one of said collecting a first physical level flows statistics and said collecting a second physical level flows statistics includes, if said determining of said collecting determines a discard is not required, incrementing a transmit count using the computed egress length indicated by the PHY-layer header.

7. The method of claim 6 wherein a transmitting of a switch-internal encapsulated payload by at least one of said first and second priority-based transmission/discarding further comprises stripping the Q-header from the switch-internal encapsulated payload.

8. The method of claim 7 further comprising extracting a PHY-header information from the PHY-level header.

9. The method of claim 8 further comprising stripping the PHY-header from the switch-internal encapsulated payload 10. The method of claim 1 wherein at least one of said first and said second priority-based transmission/discarding further comprises determining whether a first stage transit buffer space exists for the switch-internal encapsulated payload, and if said the first stage transit buffer space is determined to not exist, said payload discard is performed.

11. The method of claim 10 wherein, for at least one of said first and said second priority-based transmission/discarding, if the determining performed by said at least one priority-based transmission/discarding determines discard is required, the discarding comprises discarding all payload associated with the switch-internal encapsulated payload.

12. The method of claim 10 wherein said second priority-based transmission/discarding includes, if a discard is not required, performing final egress manipulations of the payload of the switch-internal encapsulated payload.

13. The method of claim 12 wherein said final egress manipulations comprise queuing the payload of the switch-internal encapsulated payload for transmission.

14. The method of claim 13 wherein said final egress manipulations comprise scheduling transmission of the payload of the switch-internal encapsulated payload.

15. The method of claim 1 wherein said second priority-based transmission/discarding further comprises determining whether a second stage transit buffer space exists and, if the second stage transit buffer space is determined to not exist, said collecting said second physical level flows statistics further comprises incrementing a drop count based on the PHY-level header information associated with the second stage switch-internal encapsulated payload.

16. The method of claim 15, wherein if the second stage transit buffer space is determined to exist, said collecting said second physical level flows statistics further comprises incrementing a second stage transmission count using the PHY-level header information associated with the payload of the switch-internal encapsulated payload and transmitting the payload.

* * * * *

UNITED STATES PATENT AND TRADEMARK OFFICE
CERTIFICATE OF CORRECTION

PATENT NO. : 7,636,357 B2  Page 1 of 1
APPLICATION NO. : 11/412084
DATED : December 22, 2009
INVENTOR(S) : Kuhl et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 754 days.

Signed and Sealed this

Twenty-first Day of December, 2010

David J. Kappos
*Director of the United States Patent and Trademark Office*